(12) United States Patent
Khanvilkar (10) Patent No.: US 12,008,090 B2
(45) Date of Patent: Jun. 11, 2024

(54) SYSTEM AND METHOD FOR PAIRING TRANSMITTER AND RECEIVER DEVICES USING HDCP KSV KEYS

(71) Applicant: ARRIS Enterprises LLC, Suwanee, GA (US)

(72) Inventor: Vijaykumar Khanvilkar, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 245 days.

(21) Appl. No.: 17/720,759

(22) Filed: Apr. 14, 2022

(65) Prior Publication Data

US 2023/0035146 A1    Feb. 2, 2023

Related U.S. Application Data (60) Provisional application No. 63/203,576, filed on Jul. 27, 2021.

(51) Int. Cl.
| | |
|---|---|
| *G06F 21/31* | (2013.01) |
| *G06F 21/57* | (2013.01) |
| *H04L 9/08* | (2006.01) |

(52) U.S. Cl.
CPC .......... *G06F 21/313* (2013.01); *G06F 21/575* (2013.01); *H04L 9/0822* (2013.01)

(58) Field of Classification Search
CPC ........ G06F 21/313; G06F 21/31; G06F 21/82; G06F 21/575; H04L 2209/60;

(Continued)

(56) References Cited

U.S. PATENT DOCUMENTS

| | | | |
|---|---|---|---|
| 2005/0154787 A1* | 7/2005 | Cochran | G06F 9/4411 709/219 |
| 2007/0016779 A1* | 1/2007 | Lyle | H04L 9/12 713/169 |

(Continued)

FOREIGN PATENT DOCUMENTS

| | | | |
|---|---|---|---|
| JP | 2009042929 A | * | 2/2009 |
| JP | 2012038183 A | * | 2/2012 |

OTHER PUBLICATIONS

Iyare, R. N., and S. D. Walker. "Improved High Definition Multimedia Interface Authentication Mechanism." Journal of Computer and Communications 2.12 (2014): 18. (Year: 2014).*

*Primary Examiner* — Michael Simitoski
(74) *Attorney, Agent, or Firm* — Panitch Schwarze Belisario & Nadel LLC (57) ABSTRACT

Exemplary embodiments of the present disclosure are directed to pairing HDCP-compatible transmitter and receiver devices. A transmitter device can scan one or more of its multimedia interfaces for a connected receiver device. When a connected receiver device is detected, the transmitter device determines whether the transmitter device is currently paired with the connected receiver device. If there is no current pairing, the transmitter device obtains at least a receiver KSV key from the receiver device and reads at least a transmitter KSV key from its memory. The pairing operation is either completed or terminated based on a user authentication process. If completed, the transmitter device encrypts at least the transmitter KSV key and the receiver KSV key. If terminated, the transmitter device disables the connected receiver device. Whether the pairing operation is terminated or completed, the transmitter device completes the bootup sequence.

23 Claims, 6 Drawing Sheets

(58) Field of Classification Search
CPC ... H04L 63/061; H04L 9/0822; H04L 9/0894; H04L 9/12; H04N 21/4367; H04N 21/25816; H04N 21/2585; H04N 7/167
See application file for complete search history.

(56) References Cited

U.S. PATENT DOCUMENTS

| | | | |
|---|---|---|---|
| 2008/0013725 A1* | 1/2008 | Kobayashi | H04N 21/4367 375/E7.009 |
| 2011/0013772 A1* | 1/2011 | Roethig | H04N 21/4367 380/200 |
| 2013/0174238 A1* | 7/2013 | Wang | H04N 21/43615 726/7 |
| 2014/0372759 A1* | 12/2014 | Ramachandran | H04N 21/25816 713/171 |
| 2018/0365397 A1* | 12/2018 | Viscarola | G06F 21/6209 |
| 2019/0042779 A1* | 2/2019 | Agerstam | G06F 21/554 |

* cited by examiner

SYSTEM AND METHOD FOR PAIRING TRANSMITTER AND RECEIVER DEVICES USING HDCP KSV KEYS

FIELD

The present disclosure is related to pairing transmitter and receiver devices, and particularly pairing HDCP-compatible devices using HDCP KSV keys.

BACKGROUND

Data security practices and processes are frequently used to prevent a person's personal data from being accessed or stolen from various personal electronic devices. Many security features are in place to ensure personal data is hidden and denied permission from unauthorized access. At home, a person can use a settop box associated with a content provider, and streaming or Internet of Things (IoT) devices connected to TV display for viewing various multimedia content. These devices have many applications associated with activities like subscription services to watch streaming content, shopping, gaming, social media, educational, financial, medical related applications. Because of their use across broad activities, the devices can contain lot of personal details—accounts, credit card entries, user favorites, browsing history, recorded, downloaded content, social media accounts, photos, videos, medical, financial related personal data etc. The portability of some personal electronic devices allows them be used for many nefarious purposes and activities, such as being moved from one place to another without user consent, stolen for retrieving personal data, or used for illegal purchasing or posting of derogatory comments on social media through unauthorized use of a personal account.

SUMMARY

An exemplary method is disclosed comprising: storing, in memory of a transmitter device, program code for performing a bootup sequence, the program code including instructions for performing a pairing operation, the program code causing the transmitter device to perform the steps of: scanning, by a processor of the transmitter device, one or more multimedia interfaces of the transmitter device for a connected receiver device; when the connected receiver device is detected, the program code further causing the transmitter device to perform the steps of: determining, by the processor of the transmitter device, whether the transmitter device is paired with the connected receiver device; when the transmitter device and the connected receiver device are not paired, the program code causing the processor of the transmitter device to execute the pairing algorithm and perform the steps of: obtaining, by the processor of the transmitter device from the connected receiver device, receiver device data which includes at least a receiver KSV key; reading, by the processor of the transmitter device, transmitter device data which includes at least a transmitter KSV key from the memory of the transmitter device; performing, by the transmitter device, a user authentication to verify completion of the comparison operation; the processor further performing the step of: when the user authentication is successful, completing the pairing algorithm including encrypting at least the transmitter KSV key and the receiver KSV key; or when the user authentication is unsuccessful, terminating the pairing algorithm including disabling the connected receiver device; and completing, by the processor of the transmitter device, the bootup sequence.

An exemplary transmitter device is disclosed, comprising: memory that stores program code for performing a bootup sequence, the program code including instructions for performing a pairing operation; one or more multimedia interfaces; an input device configured to receive user authentication data; a processor configured to execute the program code, the program code causing the processor to: scan each of the one or more multimedia interfaces for a connected receiver device; when the connected receiver device is detected, the program code further causing the processor to: determine whether the transmitter device is currently paired with the connected receiver device; when the transmitter device and the connected receiver device are not paired, the instructions for performing the pairing operation causing the processor to: obtain, from the connected receiver device, receiver device data which includes at least a receiver KSV key; read transmitter device data which includes at least a transmitter KSV key from the memory of the transmitter device; performing a user authentication process based on the user authentication data, the instructions further causing the processor to: when the user authentication is successful, complete the pairing operation, which includes encrypting at least the transmitter KSV key and the receiver KSV key; or when the user authentication is unsuccessful, terminate the pairing operation, which includes disabling the connected receiver device; and complete the bootup sequence An exemplary non-transitory computer readable medium storing program code for performing a bootup sequence is disclosed the program code including instructions for a performing a pairing operation, when placed in communicable contact with a transmitter device, the program code causing the transmitter device to: scan one or more multimedia interfaces of the transmitter device for a connected receiver device; receive user authentication data from a user; when the connected receiver device is detected, the program code further causes the transmitter device to: determine whether the transmitter device is currently paired with the connected receiver device; when the transmitter device and the connected receiver device are not paired, the instructions for performing the pairing operation causing the transmitter device to: obtain, from the connected receiver device, receiver device data which includes at least a receiver KSV key; read transmitter device data which includes at least a transmitter KSV key from the memory of the transmitter device; perform a user authentication based on the user authentication data, the program code further causes the transmitter device to: when the user authentication is successful, complete the pairing operation, which includes encrypting at least the transmitter KSV key and the receiver KSV key; or when the user authentication is unsuccessful, terminate the pairing operation, which includes disabling the connected receiver device; and complete the bootup sequence.

An exemplary method is disclosed comprising: storing, in memory of a transmitter device, program code for performing a pairing operation for the transmitter device; scanning, by a processor of the transmitter device, one or more multimedia interfaces of the transmitter device for a connected receiver device; when the connected receiver device is detected, performing, by the processor of the transmitter device, a callback to execute the pairing operation, the program code causing the processor to perform the steps of: obtaining, by the processor of the transmitter device from the connected receiver device, receiver device data which includes at least a receiver KSV key; comparing, by the processor of the transmitter device, at least the receiver KSV key to another receiver KSV key stored in the memory; and when the comparison is successful, completing the pairing operation including generating and sending a signal to enable the connected receiver device; or when the comparison is unsuccessful, terminating the pairing operation including generating and sending a signal to disable the connected receiver device.

An exemplary transmitter device is disclosed, comprising: memory that stores program code for performing a pairing operation; one or more multimedia interfaces; a processor configured to scan each of the one or more multimedia interfaces for a connected receiver device, wherein when the connected receiver device is detected, the processor being further configured to perform a callback to execute the program code for performing the pairing operation, the program code causing the processor to: obtain receiver device data which includes at least a receiver KSV key from the connected receiver device; compare at least the receiver KSV key to another receiver KSV key stored in the memory; and when the comparison is successful, completing the pairing operation including generating and sending a signal to enable the connected receiver device; or when the comparison is unsuccessful, terminating the pairing operation including generating and sending a signal to disable the connected receiver device.

An exemplary non-transitory computer readable medium storing program code for performing at least a pairing operation for a transmitter device is disclosed, when placed in communicable contact with a transmitter device, the program code causing the transmitter device to: scan one or more multimedia interfaces for a connected receiver device, wherein when the connected receiver device is detected, the transmitter device performing a callback to execute the program code for performing the pairing operation, the program code causing the transmitter device to: obtain receiver device data, which includes at least a receiver KSV key, from the connected receiver device; compare at least the receiver KSV key to another receiver KSV key stored in the memory; and when the comparison is successful, completing the pairing operation including generating and sending a signal to enable the connected receiver device; or when the comparison is unsuccessful, terminating the pairing operation including generating and sending a signal to disable the connected receiver device.

DETAILED DESCRIPTION

Exemplary embodiments of the present disclosure are directed to securing a multimedia device and personal data by pairing a device which transmits multimedia content with receiver device so that they are known to each other. The pairing can be terminated, if the transmitter device is moved and the wired or wireless connection with the receiver device is broken. Once the pairing is broken or lost, the transmitter device generates a signal to disable the receiver device (e.g., display device), which prevents any personal or device data from being viewed or accessed on the device. As a result, the transmitter device can provide security against circumstances when the pairing is broken due to a user's personal device being stolen or moved from a designated location and connected to different receiver device (e.g., TV display or monitor) without consent. In situations where a transmitter device is intentionally disconnected from a paired receiver (e.g., display or monitor) device and an attempt is made to pair the transmitter device with a new receiver device, the transmitter device can prompt the user to enter a passcode, which the transmitter device verifies to enable the new pairing. By virtue of the exemplary methods of the present disclosure, the pairing between the transmitter device and a receiver device can be checked each time the transmitter device is rebooted or the receiver device is connected on the fly, which the transmitter device uses to enable the receiver device for displaying content it transmits thereto.

Figure 1:
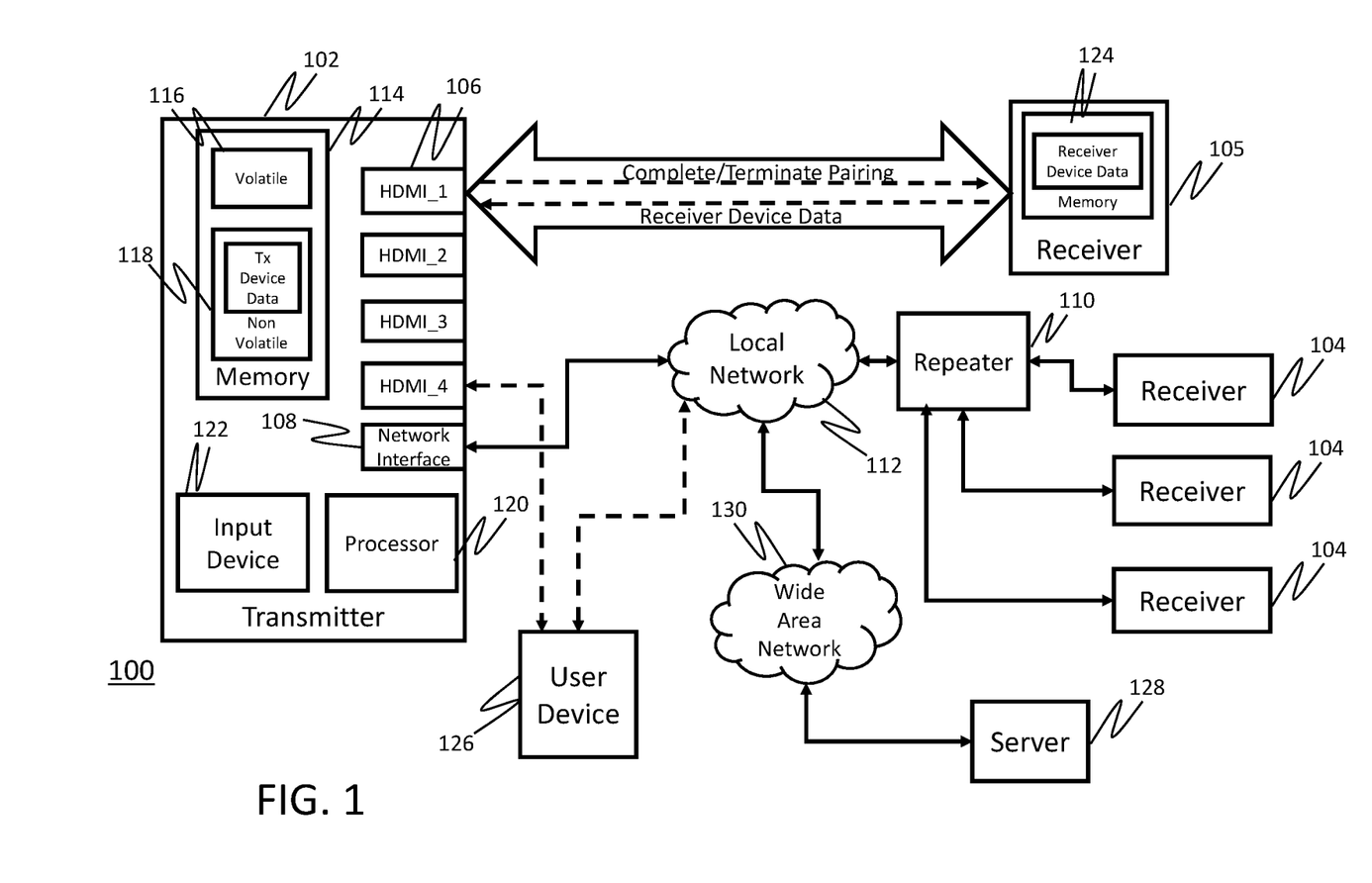
FIG. 1 illustrates a block diagram of a system for pairing a transmitter device and receiver device in accordance with an exemplary embodiment of the present disclosure.

FIG. 1 illustrates a block diagram of a system for pairing a transmitter device and receiver device in accordance with an exemplary embodiment of the present disclosure.

As shown in FIG. 1, the system 100 can include a transmitter device 102 which can be connected to any of a plurality of receiver devices 104. The transmitter device 102 can be a communication device configured for connecting to a local area network 112 in a home or premise and distributing multimedia content to one or more of the receiving devices 104 within the home or premise. According to an exemplary embodiment, the transmitter device can be configured to operate as settop box associated with a content provider, a streaming media player, a smart device configured to output multimedia content, an Internet of Things-compatible (IoT) device, or any other suitable device for outputting or sending multimedia content to a receiver. The transmitter device 102 can be a High-Definition Multimedia Interface (HDMI)-compliant device or any other suitable device and include one or more multimedia interfaces, such as an HDMI port 106, for sending uncompressed video data and compressed or uncompressed digital audio data to one or more receiver devices 104. According to an exemplary embodiment, the multimedia interface can also include a network interface 108, which provides for the transmission of multimedia content over a wired or wireless network, such as local network 112. The network interface 108 can provide a connection to a receiver device 104 over the local network 112 through a repeater device 110. The repeater device 110 can include any known devices which operate on a communication channel of a local network to amplify a received signal and retransmit the amplified signal over the local network. The receiver device 104 can be an HDMI-compliant and/or HDMI-compatible device, which is configured as computer monitor, video projector, digital television, or digital audio device any or which includes any combination of these individual components.

The transmitter device 102 can also include memory 114 which stores program code for performing a bootup sequence and program code for performing pairing operation according to the exemplary embodiments disclosed herein. The memory 114 can include one or both of a volatile memory 116 and non-volatile memory 118 and non-volatile portion 120 for storing information and data associated with a user, processing and/or configuration data associated with the system 100 and/or components of the system as desired.

The transmitter device 102 includes a processor 120, which executes the program code to run the bootup sequence. The processor 120 scans one or more of the multimedia interfaces (e.g., 106, 108, 122) of the transmitter device 102 for a connected receiver device 105. When the processor 120 detects a connected receiver device 104 on one of the multimedia interfaces (e.g., 106, 108, 110), the processor executes a pairing algorithm as specified by the program code for performing the pairing operation. The processor 120 determines whether the transmitter device is paired with the connected receiver device 105. The pairing of transmitter device 102 and the receiver device 104 is based on High-bandwidth Digital Content Protection Key Selection Vector (HDCP KSV). HDMI is a known interface (e.g., connector) between transmitter and display devices in which High-bandwidth Digital Content Protection (HDCP) keys associated with each of the transmitter device 102 and the receiver device 104 are provided for digital copy protection. Each HDCP device has an identifier and stores an array of 40, 56-bit secret device keys which make up its "Device Private Keys". The identifier is a 40-bit binary value known as a Key Selection Vector (KSV). Each HDCP device stores a unique KSV key which it exchanges with another HDCP device during the HDCP authentication process. For example, the transmitter device 102 can store a KSV key (Aksv) and the receiver device(s) 104, 105 can store a KSV key (Bksv).

If the transmitter device 102 and the connected receiver device 105 are not paired, the processor 120 receives receiver device data from the connected receiver device 105. For example, the transmitter device 102 can read the memory 124 of the connected receiver device 105 to obtain at least a receiver KSV key. The receiver device data can also include at least one of a manufacturer name, a serial number, a date of manufacturing, or any other suitable information as desired. According to an exemplary embodiment, if a connected receiver device 104, 105 is connected to the one or more multimedia interfaces 106, such as a network interface 108, through one or more repeater devices 110, the processor 120 can still upload or obtain the receiver KSV key over the local network 112. The transmitter device 102 stores the receiver KSV keys in non-volatile memory 118.

In addition, the processor 120 can read transmitter device data from the memory 120. The transmitter device data includes at least a transmitter KSV key of the transmitter device 102. According to exemplary embodiments of the present disclosure, the transmitter device data can include a manufacturer name, a serial number, a date of manufacturing, a location of manufacturing, or any other suitable information as desired. The processor 120 can perform one or more user authentication algorithms to verify that performance of the pairing operation is desired. For example, according to an exemplary embodiment the processor 120 can generate a signal, which prompts the user to input a user passcode. For example, the transmitter device 102 can include or be connected to an input device 122, such as a touch display, a keypad, a microphone, a keyboard or any other suitable device for accepting or receiving information from a user. The processor 120 compares the user passcode to a user code previously stored in memory 114. When the comparison is successful (e.g., the user passcode matches the stored user code), the processor 120 completes the pairing operation, which includes encrypting at least the transmitter KSV key of the transmitter device data and at least the receiver KSV key of the receiver device data. The encryption operation can also include encrypting any or all of the other information included in the transmitter device data and the receiver device data as desired. When the comparison is unsuccessful (e.g., the user passcode does not match the stored user code), the processor 120 terminates the pairing operation, which includes disabling the connected receiver device. The processor 120 completes the bootup sequence following the completion or termination of the pairing operation.

According to another exemplary embodiment, the user authentication can include other single authentication processes such as biometric recognition techniques or challenge-response protocols. The challenge-response techniques can include static (e.g., password or code entry) or dynamic challenges (e.g., randomly changing such as static CAPTCHA ("Completely Automated Public Turing test to tell Computers and Humans Apart"), reCAPTCHA, etc.) or other suitable user challenge-response techniques or protocols as desired. For example, the transmitter device 102 can include one or more input devices 122 such as a camera, keyboard (real or virtual), microphone, biometric scanner (e.g., facial, fingerprint, retinal, etc.), or any other suitable device as desired. According to yet another exemplary embodiment, the user authentication can use multiple authentication techniques for a single authentication or verification. The processor 120 can generate a signal which prompts the user to use one or more of the input devices 122 to provide data required for user authentication. For example, the user can be prompted via a message output on a connected display device to use the input device(s) 122 to provide a facial image, input text or a code, a voice response (e.g., phrase, word, etc.), or other biometric information as desired. The input data can be compared to locally or remotely stored user identification data for verifying or authenticating the identity of the user. According to an exemplary embodiment, communication conducted between devices using the challenge-response technique can be encrypted.

According to another exemplary embodiment, the authentication process can involve the use of authentication tokens. For example, the transmitter device 102 or a user device 126 connected to the transmitter device 102 can be configured to communicate with a server 128 connected to the local network 112 via wide area network (WAN) 130. The server 128 can generate an authentication token based on the input data provided by the user. The authentication token can be sent to the transmitter device 102 directly or via the user device 126 depending on manner in which the user authentication information is entered. The user device 126 can include a remote control device, a smart device, a laptop or desktop computer, a tablet, or any other suitable device for wired or wireless communication with the transmitter device 102. For example, the user device 126 can be configured to execute an application program interface (API) for control, operation, and/or configuration of the transmitter device 102 and/or at least the pairing operation of the transmitter device 102. The user device 126 can be wired or wirelessly connected to the transmitter device 102 through the LAN 112 or a peer-to-peer connection through the HDMI port 106, Bluetooth, or other suitable connection technique as desired. Upon execution of the API, the user device 126 can display a prompt generated based on a signal received from the transmitter device 102. The prompt can instruct the user to enter user authentication information through one or more of the input device(s) of the user device 126. As already discussed, once the user authentication information is received the user device or the transmitter device 102 can send a token request to the server 128. The server 132 can generate a token which validates the user and as a result the pairing operation with the connected receiver 105. According to an exemplary embodiment, the token can be configured to expire after a predetermined time period, when the user logs off from the API or when the transmitter device 102 is powered off, or according to any other suitable limit on access as desired.

According to exemplary embodiments various other known authentication techniques, which use one-time passwords, API generated codes, or physical authentication keys can be used for verifying completion of the pairing operation. Furthermore, while the user authentication process has been discussed as following receipt of the transfer of transmitter and receiver KSV keys, it should be understood and readily apparent that the user authentication can be performed at any point prior to the KSV key exchange or transfer, such as when the transmitter is powered on, when a connected receiver device 105 is detected, or at any other suitable time before or during the pairing operation as desired.

Figure 2A:
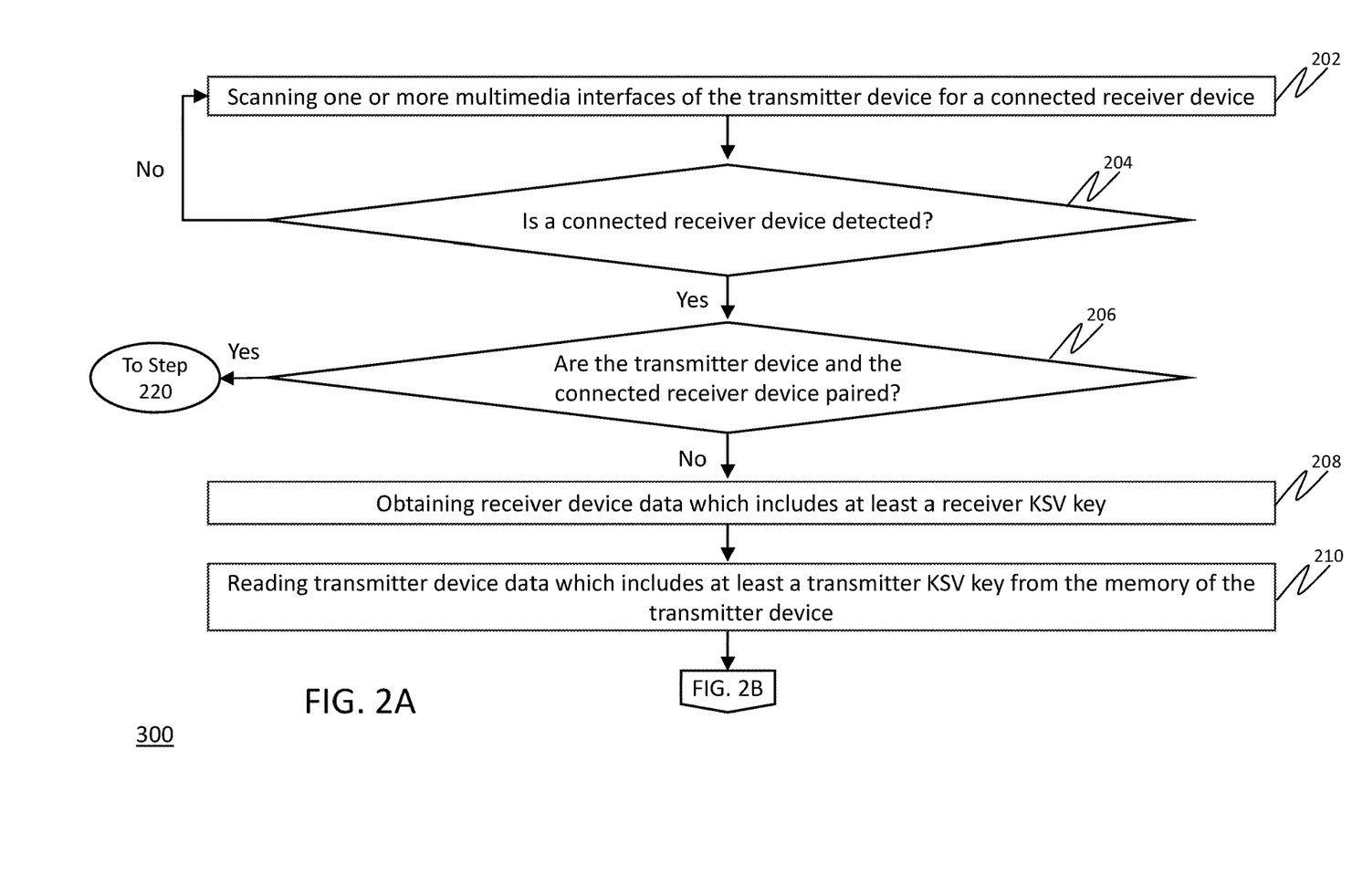
FIGS. 2A and 2B illustrate a method for pairing a transmitter device and a receiver device in accordance with an exemplary embodiment of the present disclosure.
Figure 2B:
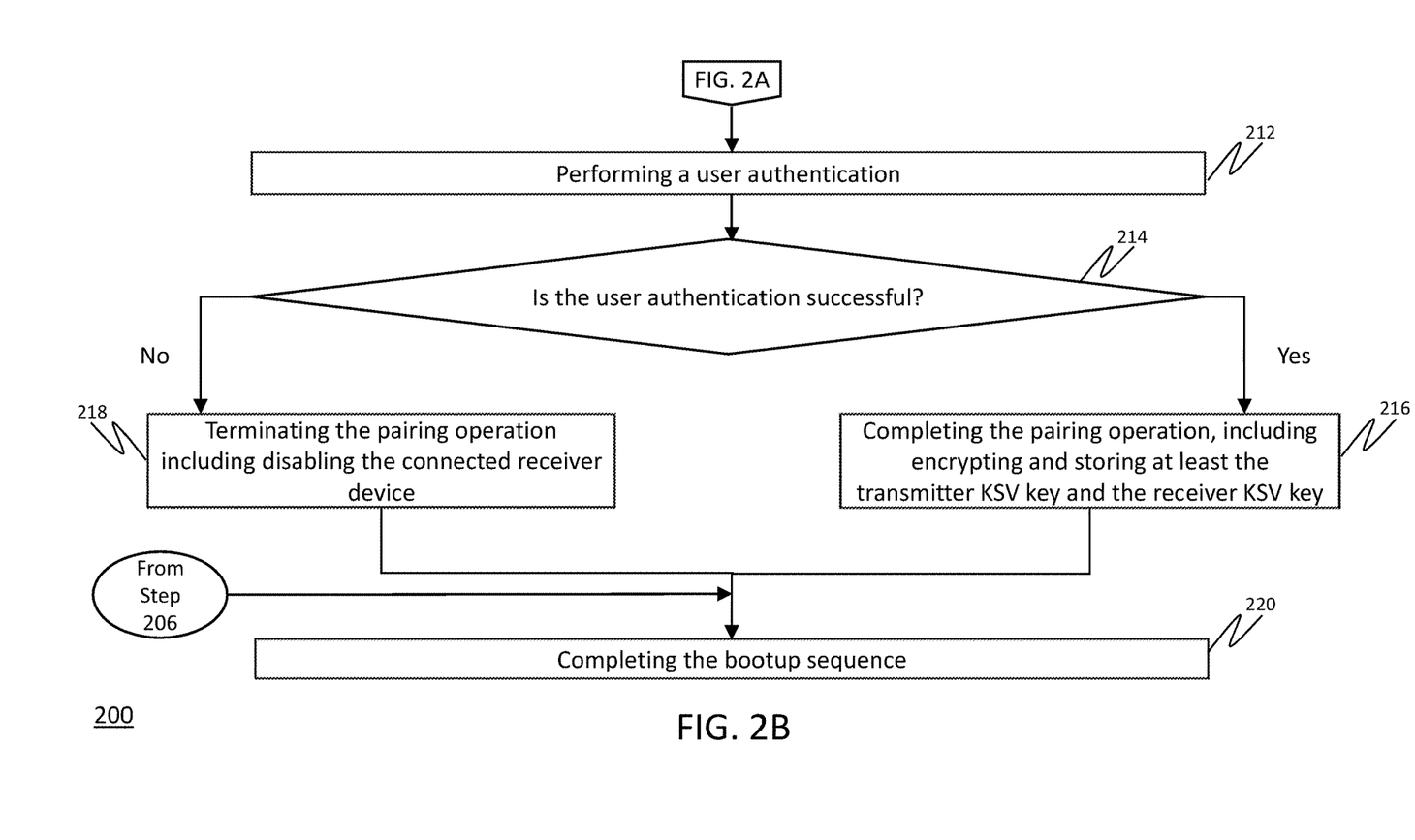

FIGS. 2A and 2B illustrate a first method for pairing a transmitter device and a receiver device in accordance with an exemplary embodiment of the present disclosure.

The method 200 is based on program code for performing a bootup sequence and for performing a pairing operation as discussed above. According to an exemplary embodiment, the program code can be configured with separate modules for each operation or be included in separate program code files, where the program code for the bootup sequence can include a pointer to the file for executing the pairing algorithm.

In a Step 202, the processor 120 of the transmitter device 102, scans the one or more multimedia interfaces (106, 108, 110) for a connected receiver device 104, 105. If a connected receiver device 104, 105 not detected (Step 204), the processor 120 repeats (at least periodically) the scanning of the multimedia interface(s) (106, 108, 110). If a connected receiver device 105 is detected (Step 204), the processor 120 determines whether a pairing of the transmitter device 102 and the connected receiver device 105 already exists (Step 206). If the transmitter device 102 and the connected receiver device 105 are already paired, then the processor 120 continues the bootup sequence without the pairing operation (Step 220). If the pairing operation is required, the processor 120 obtains receiver device data from the connected receiver device 105 (Step 208). For example, the processor 120 can obtain access to the memory 124 of the connected receiver device 105 and read or download the receiver device data over the multimedia interface 106. The receiver device data can include at least a receiver KSV key and, as already discussed, may also include one or more of a manufacturer name, a serial number, a date of manufacturing, or any other suitable receiver information as desired. In a Step 210, the processor 120 obtains transmitter device data of the transmitter device 102 by reading this information from the non-volatile memory 118. The transmitter device 102 data can include at least a transmitter KSV key.

The processor 120 can perform a user authentication process (Step 212). The user authentication process can include any known user authentication process based on user authentication data input by the user via one or more input devices 122 of the transmitter device 102 or a user device 132. If the user authentication is successful (Step 214), the processor 120 completes the pairing operation, which includes encrypting at least the transmitter KSV key and the receiver KSV key and storing the encrypted keys in memory 118 (Step 216). However, if the user authentication is unsuccessful (Step 214), the processor 120 can terminate the pairing operation and disable the connected receiver device 104 (Step 218). Prior to terminating the pairing operation, the processor 120 can retry the failed user authentication. For example, if the user authentication data received from the user includes entry a user passcode, the processor 120 can prompt the user to retry or reenter the user passcode. The processor 120 can be configured to allow a predetermined number of unsuccessful attempts by increasing a counter value each time the passcode is reentered and compare the counter value to a threshold value after each unsuccessful attempt. If counter value meets or exceeds the threshold value, then the processor 120 can terminate the pairing operation. The disabling of the connected receiver device can include generating a control signal that powers down the connected receiver device 105 and/or causes a notice or message regarding the unsuccessful pairing operation to be displayed on the connected receiver device 105. According to another exemplary embodiment, the processor 120 can cause the connected receiver device 105 display a notice regarding the unsuccessful paring operation and deactivate the multimedia interface 106 to which the connected receiver device 104 is connected such that no data can be communicated between the transmitter device 102 and the connected receiver device 104. The specified multimedia interface 106 can be deactivated until a wired or wireless connection with the connected receiver device 105 is broken, the deactivation can last for a predetermined period of time, or until the transmitter device 102 is rebooted. In step 220, the processor 120 completes the bootup sequence.

Figure 3A:
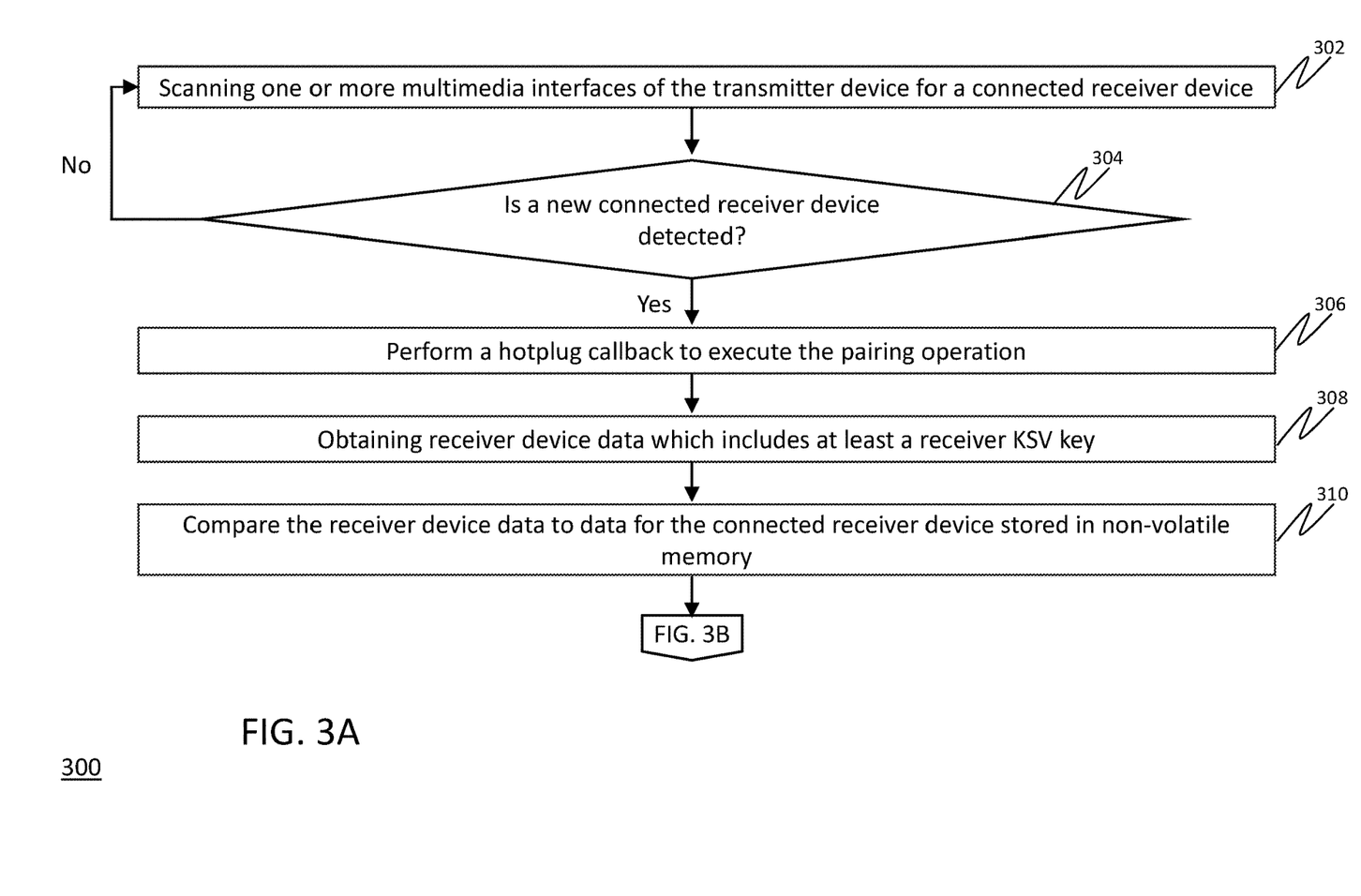
FIGS. 3A and 3B illustrate a second method for pairing a transmitter device and a receiver device in accordance with an exemplary embodiment of the present disclosure.
Figure 3B:
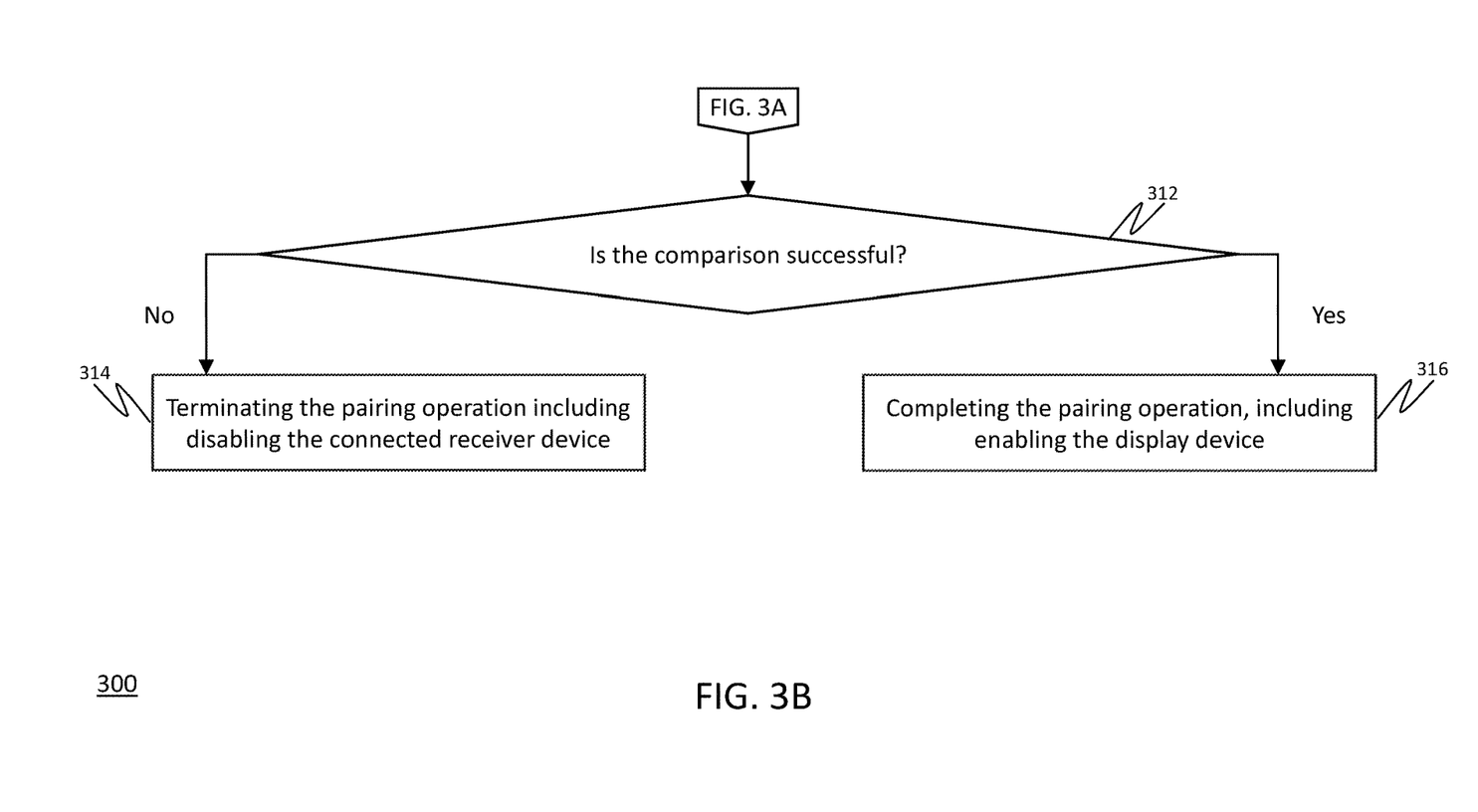

FIGS. 3A and 3B illustrate a second method for pairing a transmitter device and a receiver device in accordance with an exemplary embodiment of the present disclosure.

The method 300 is performed after the transmitter device has completed the bootup sequence and the transmitter device and the receiver device have been previously paired. In a Step 302, the processor 120 of the transmitter device 102, scans the one or more multimedia interfaces (106, 108, 110) for a connected receiver device 104, 105. If a connected receiver device 104, 105 not detected (Step 304), the processor 120 repeats (at least periodically) the scanning of the multimedia interface(s) (106, 108, 110). If a connected receiver device 105 is detected (Step 304), the processor 120 performs a hotplug callback to the program code for performing the pairing operation (Step 306). In step 308, the processor 120 obtains receiver device data from the connected receiver device 105. The receiver device data is compared with data for the connected receiver device 105, which is stored in non-volatile memory 118 (Step 310). If the comparison is successful (Step 314), then the connected receiver device 105 is enabled and the pairing operation is completed (Step 316). For example, the processor 120 can generate a signal and send the signal to the receiver device 104 for enabling the connected receiver device 104. If the comparison is unsuccessful (Step 312), the connected receiver device 105 is disabled (Step 318). For example, the processor 120 can generate a signal and send the signal to the receiver device 104 for disabling the connected receiver device 104.

Figure 4:
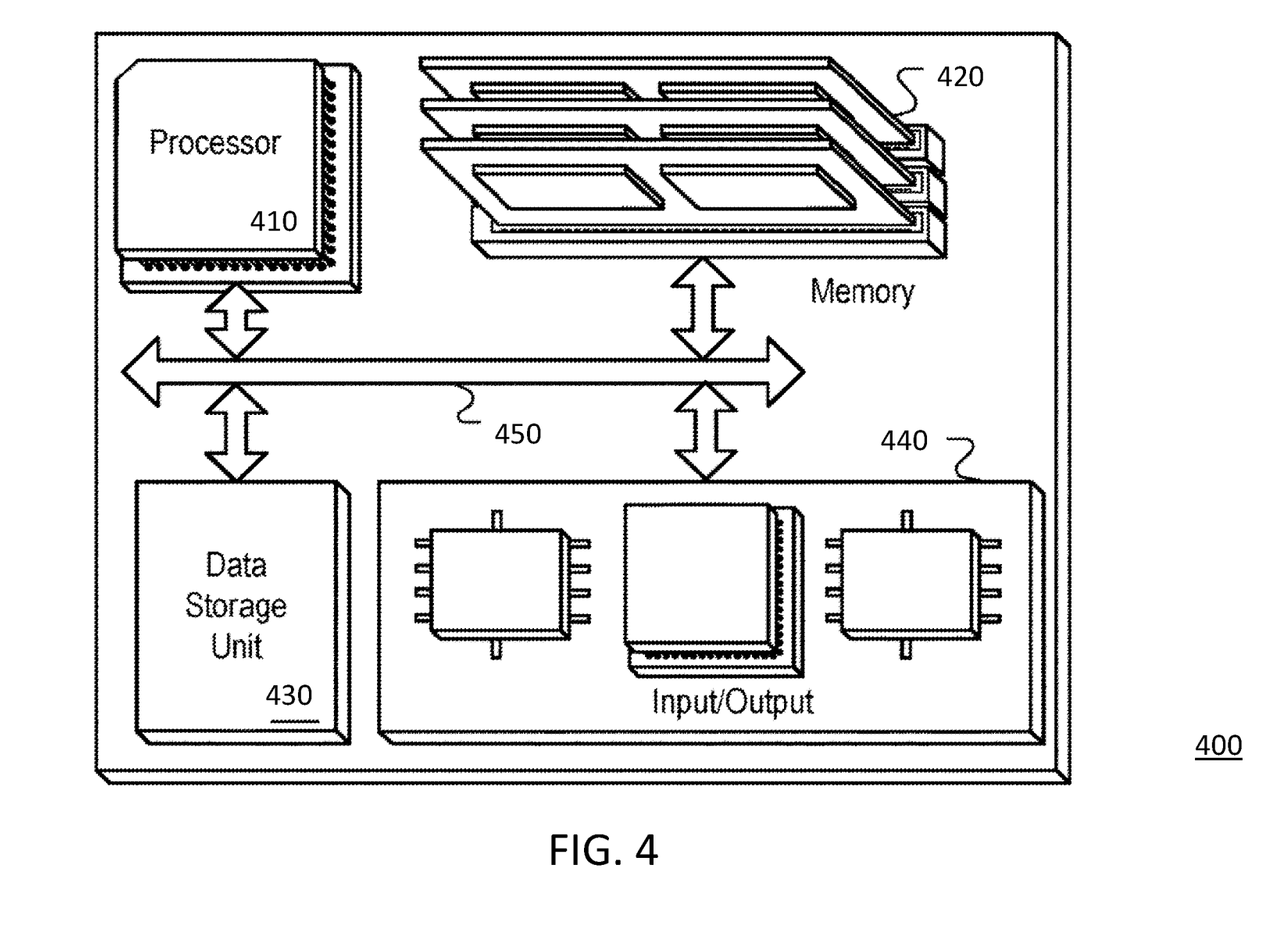
FIG. 4 illustrates a hardware configuration in accordance with an exemplary embodiment of the present disclosure.

FIG. 4 is a block diagram of a hardware configuration 400 of a computing device (e.g., transmitter device) in accordance with an exemplary embodiment of the present disclosure. It should be understood that exemplary embodiments of the present disclosure can be implemented using one or more hardware configurations 400 having any combination of features, functions, and/or components described in the discussion that follows and connected to communicate over a network. For example, the computing device can include a customer premise device such as a settop box, a smart media device, a smart assistant, an IoT device and/or any other suitable HDMI-compliant and/or HDCP-compatible device as desired.

The hardware configuration 400 can include a processor (e.g., processing device) 410, a memory (e.g., memory device) 420, a data storage device 430, and an input/output device 440. Each of the components 410, 420, 430, and 440 can be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can include, for example, a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more multimedia (HDMI) interfaces for communicating with other smart devices and/or cloud storage over a network. In exemplary embodiments, the input/output device 440 can include driver devices configured to send communications to, and receive communications from one or more networks (e.g., subscriber network, WAN, local network, etc.).

According to exemplary embodiments, the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier, which when executed control the operation of the data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. According to exemplary embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features, that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination in some cases can be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

The preceding description may refer to 'some embodiments.' which describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method comprising:
storing, in memory of a transmitter device, program code for performing a bootup sequence, the program code including instructions for performing a pairing operation, the program code causing the transmitter device to perform the steps of:
scanning, by a processor of the transmitter device, one or more multimedia interfaces of the transmitter device for a connected receiver device;
when the connected receiver device is detected, the program code further causing the transmitter device to perform the steps of:
determining, by the processor of the transmitter device, whether the transmitter device is paired with the connected receiver device;
when the transmitter device and the connected receiver device are not paired, the program code causing the processor of the transmitter device to execute the instructions and perform the steps of:
  obtaining, by the processor of the transmitter device from the connected receiver device, receiver device data which includes at least a receiver KSV key;
  reading, by the processor of the transmitter device, transmitter device data which includes at least a transmitter KSV key from the memory of the transmitter device;
  performing, by the transmitter device, a user authentication to authorize completion of the comparison operation;
  the processor further performing the step of:
    when the user authentication is successful, completing the pairing algorithm including encrypting at least the transmitter KSV key and the receiver KSV key; or
    when the user authentication is unsuccessful, terminating the pairing algorithm including disabling the connected receiver device; and
  completing, by the processor of the transmitter device, the bootup sequence.

2. The method of claim 1, comprising:
storing, by the processor of the transmitter device, pairing information for the connected receiver device in non-volatile memory, the pairing information including at least the encrypted transmitter KSV key and the receiver KSV key.

3. The method of claim 1, wherein the connected receiver device is a display device.

4. The method of claim 1, wherein the one or more multimedia interfaces includes at least one high-definition multimedia (HDMI) port.

5. The method of claim 1, wherein the one or more multimedia interfaces includes a network interface, and wherein the connected receiver device is connected to the network interface by a repeater device.

6. The method of claim 1, wherein when the transmitter device and the connected receiver device are currently paired, the program code causing the processor of the transmitter device to skip the pairing operation and complete the bootup sequence.

7. The method of claim 1, wherein the receiver device data further includes at least one of a manufacturer name, a serial number, and a date of manufacturing.

8. The method of claim 1, wherein the transmitter device data further includes at least one of a manufacturer name, a serial number, and a date of manufacturing.

9. The method of claim 1, wherein the one or more multimedia interfaces includes a network interface, and wherein a plurality of receiver devices including the connected receiver device are connected to the network interface of the transmitter device by a repeater device.

10. The method of claim 9, comprising:
storing pairing information for each of the plurality of receiver devices in non-volatile memory, the pairing information including at least the encrypted transmitter KSV key and the receiver KSV key.

11. The method of claim 1, wherein when the user authentication comprises entry of a user passcode and the user authentication is unsuccessful, the method comprising:
prompting, by the processor of the transmitter device, the user for reentry of the user passcode;
comparing, by the processor of the transmitter device, the reentered user passcode to a pre-stored user code;
repeating, by the processor of the transmitter device, the reentry prompt when the user authentication unsuccessful;
increasing, by the processor of the transmitter device, a counter each time the reentry prompt is repeated;
comparing, by the processor of the transmitter device, a current value of the counter to a predetermined threshold after an unsuccessful user authentication; and
terminating, by the processor of the transmitter device, the pairing operation when the counter value meets or exceeds the predetermined threshold.

12. A transmitter device, comprising:
memory that stores program code for performing a bootup sequence, the program code including instructions for performing a pairing operation;
one or more multimedia interfaces;
an input device configured to receive user authentication data;
a processor configured to execute the program code, the program code causing the processor to:
scan each of the one or more multimedia interfaces for a connected receiver device;
when the connected receiver device is detected, the program code further causing the processor to:
determine whether the transmitter device is currently paired with the connected receiver device;
when the transmitter device and the connected receiver device are not paired, the instructions for performing the pairing operation causing the processor to:
obtain, from the connected receiver device, receiver device data which includes at least a receiver KSV key;
read transmitter device data, which includes at least a transmitter KSV key, from the memory of the transmitter device;
performing a user authentication process based on the user authentication data, the instructions for performing the pairing operation further causing the processor to:
when the user authentication is successful, complete the pairing operation, which includes encrypting at least the transmitter KSV key and the receiver KSV key; or
when the user authentication is unsuccessful, terminate the pairing operation, which includes disabling the connected receiver device; and
complete the bootup sequence.

13. The transmitter device of claim 12, comprising:
nonvolatile memory that stores pairing information for the connected receiver device, the pairing information including at least the encrypted transmitter KSV key and the receiver KSV key.

14. The transmitter device of claim 12, configured to operate as a set-top box associated with a content provider.

15. The transmitter device of claim 12, wherein the connected receiver device is a display device.

16. The transmitter device of claim 15, wherein when the transmitter device and the connected receiver device are currently paired, the processor is configured to skip the pairing operation and completes the bootup sequence.

17. The transmitter device of claim 12, wherein the receiver device data further includes at least one of a manufacturer name, a serial number, and a date of manufacturing.

18. The transmitter device of claim 12, wherein the transmitter device data further includes at least one of a manufacturer name, a serial number, and a date of manufacturing.

19. The transmitter device of claim 12, wherein the one or more multimedia interfaces includes at least one HDMI port.

20. The transmitter device of claim 19, wherein the one or more multimedia interfaces includes a network interface, and wherein a plurality of receiver devices including the connected receiver device are connected to the network interface of the transmitter device by a repeater device.

21. The transmitter device of claim 12, comprising:
non-volatile memory that stores pairing information for each of a plurality of receiver devices, the pairing information including at least the encrypted transmitter KSV key and the receiver KSV key.

22. The transmitter device of claim 12, wherein when the user authentication comprises entry of a user passcode and the user authentication is unsuccessful, the program code causes the processor to:
prompt a user for reentry of the user passcode;
compare the reentered user passcode to a pre-stored user code;
repeat the reentry prompt when the user authentication unsuccessful;
increase a counter each time the reentry prompt is repeated;
compare a current value of the counter to a predetermined threshold after each unsuccessful authentication; and
terminate the pairing operation if the counter value meets or exceeds the predetermined threshold.

23. A non-transitory computer readable medium storing program code for performing a bootup sequence, the program code including instructions for a performing a pairing operation, when placed in communicable contact with a transmitter device, the program code causing the transmitter device to:
scan one or more multimedia interfaces of the transmitter device for a connected receiver device;
receive user authentication data from a user;
when the connected receiver device is detected, the program code further causes the transmitter device to:
determine whether the transmitter device is currently paired with the connected receiver device;
when the transmitter device and the connected receiver device are not paired, the instructions for performing the pairing operation causing the transmitter device to:
obtain, from the connected receiver device, receiver device data which includes at least a receiver KSV key;

read transmitter device data which includes at least a transmitter KSV key from the memory of the transmitter device;

perform a user authentication based on the user authentication data, the instructions further causes the transmitter device to:

when the user authentication is successful, complete the pairing operation, which includes encrypting at least the transmitter KSV key and the receiver KSV key; or when the user authentication is unsuccessful, terminate the pairing operation, which includes disabling the connected receiver device; and complete the bootup sequence.

\* \* \* \* \*